US007810070B2

(12) United States Patent
Nasuti et al.

(10) Patent No.: US 7,810,070 B2
(45) Date of Patent: Oct. 5, 2010

(54) SYSTEM AND METHOD FOR SOFTWARE TESTING

(75) Inventors: William John Nasuti, Cary, NC (US); Connie Stout Dunbar, Cary, NC (US)

(73) Assignee: SAS Institute Inc., Cary, NC (US)

( * ) Notice: Subject to any disclaimer, the term of this patent is extended or adjusted under 35 U.S.C. 154(b) by 962 days.

(21) Appl. No.: 10/811,789

(22) Filed: Mar. 29, 2004

(65) Prior Publication Data

US 2005/0229043 A1 Oct. 13, 2005

(51) Int. Cl.
*G06F 9/44* (2006.01)
(52) U.S. Cl. ...................................... 717/124
(58) Field of Classification Search .................. 717/124
See application file for complete search history.

(56) References Cited

U.S. PATENT DOCUMENTS

| | | | |
|---|---|---|---|
| 5,086,393 A | 2/1992 | Kerr et al. | |
| 5,475,843 A | 12/1995 | Halviatti | |
| 5,528,735 A | 6/1996 | Strasnick et al. | |
| 5,566,291 A | 10/1996 | Boulton et al. | |
| 5,669,000 A | 9/1997 | Jessen et al. | |
| 5,724,262 A | 3/1998 | Ghahramani | |
| 5,892,947 A * | 4/1999 | DeLong et al. | 717/100 |
| 5,905,856 A * | 5/1999 | Ottensooser | 714/38 |
| 6,002,869 A | 12/1999 | Hinckley | |
| 6,031,990 A * | 2/2000 | Sivakumar et al. | 717/124 |
| 6,219,839 B1 | 4/2001 | Sampsell | |
| 6,222,557 B1 | 4/2001 | Pulley, IV et al. | |
| 6,237,138 B1 | 5/2001 | Hameluck et al. | |
| 6,259,451 B1 | 7/2001 | Tesler | |
| 6,301,579 B1 | 10/2001 | Becker | |
| 6,326,985 B1 * | 12/2001 | Tazoe et al. | 715/764 |
| 6,400,366 B1 | 6/2002 | Davies et al. | |
| 6,405,364 B1 * | 6/2002 | Bowman-Amuah | 717/101 |
| 6,449,744 B1 * | 9/2002 | Hansen | 714/738 |
| 6,480,194 B1 | 11/2002 | Sang'udi et al. | |
| 6,513,154 B1 | 1/2003 | Porterfield | |
| 6,526,526 B1 | 2/2003 | Dong et al. | |
| 6,529,216 B1 | 3/2003 | Moore et al. | |
| 6,694,288 B2 | 2/2004 | Smocha et al. | |
| 6,725,399 B1 * | 4/2004 | Bowman | 714/38 |
| 6,775,819 B1 | 8/2004 | Hardikar et al. | |
| 6,792,460 B2 | 9/2004 | Oulu et al. | |
| 6,842,176 B2 | 1/2005 | Sang'udi et al. | |
| 6,898,556 B2 | 5/2005 | Smocha et al. | |

(Continued)

OTHER PUBLICATIONS

Mark H. Walker and Nanette Eaton, Microsoft Office Visio 2003 Inside Out , Microsoft Press, Oct. 29, 2003.*

(Continued)

*Primary Examiner*—Philip Wang
(74) *Attorney, Agent, or Firm*—Jones Day

(57) ABSTRACT

Systems and methods for evaluating the testing of a computer program wherein a test automator generates code to test the computer program with respect to predetermined testing criteria. A test results analyst reviews test results generated by applying the code to test the computer program. The environments of a test automator and a test analyst are separated, thereby relieving a test results analyst from being required to have knowledge of the code that was used to test the computer program.

9 Claims, 17 Drawing Sheets

U.S. PATENT DOCUMENTS

| | | | |
|---|---|---|---|
| 6,907,382 | B2 | 6/2005 | Urokohara |
| 7,068,267 | B2 | 6/2006 | Meanor et al. |
| 7,082,381 | B1 | 7/2006 | Saghier et al. |
| 7,197,370 | B1 | 3/2007 | Ryskoski |
| 7,222,265 | B1 * | 5/2007 | LeSuer et al. ............... 714/38 |
| 7,237,231 | B2 | 6/2007 | Lambert |
| 7,313,564 | B2 | 12/2007 | Melamed et al. |
| 7,577,769 | B2 | 8/2009 | Cobb et al. |
| 2001/0028359 | A1 | 10/2001 | Muraishi et al. |
| 2002/0029377 | A1 * | 3/2002 | Pavela ..................... 717/124 |
| 2003/0135843 | A1 * | 7/2003 | Sluiman et al. ............ 717/124 |
| 2004/0107415 | A1 | 6/2004 | Melamed et al. |
| 2004/0139385 | A1 | 7/2004 | Sakaue |
| 2005/0015666 | A1 * | 1/2005 | Kamani et al. ............... 714/25 |
| 2005/0154557 | A1 | 7/2005 | Ebert |
| 2005/0210397 | A1 | 9/2005 | Kanai et al. |
| 2005/0240618 | A1 | 10/2005 | Nickerson et al. |
| 2005/0283736 | A1 | 12/2005 | Elie |
| 2006/0265368 | A1 | 11/2006 | Nickerson et al. |
| 2006/0265492 | A1 | 11/2006 | Morris |
| 2007/0027652 | A1 | 2/2007 | Hosagrahara |
| 2007/0083854 | A1 | 4/2007 | Mayer-Ullmann et al. |
| 2008/0127101 | A1 | 5/2008 | Anafi et al. |

OTHER PUBLICATIONS

Buwalda, Hans et al., "Getting Automated Testing Under Control," Software TEsting & Quality Engineering, pp. 39-44, Nov./Dec. 1999.

Buwalda, Hans, "It can be complicated to automate model-based testing. Here's how to employ action words to get the job done.", STQE Magazine, Software Quality Engineering, pp. 42, 44, 46-47, Mar./Apr. 2003.

"When-D4.2 Test Automation Approach", B-K Medial Group, Issue 1.0, pp. 1-14, Jul. 5, 2000.

Ganci, John et al., "Rational Application Developer V6 Programming Guide", IBM Redbooks, 21 page of Table of Contents and pp. 4, 5, 503-524 and 1087-1099 [Jun 2, 2005].

"Java Static Analysis, Code Review, Unit Testing, Runtime Error Detection", http://www.parasoft.com/jsp/products/jtest.jsp;jsessionid=aaacAMw30bA6G4?ITEMId=14, 1 pg. (Jul. 20, 2009).

"Parasoft Jtest—Now Available With Test Case Sniffer", http://web.archive.org/web/20060404223614/http://parasoft.com/jsp/products/home.jsp?jproduct=Jtest, 4 pp. (Apr. 4, 2006).

Dockendorf, Scott, "Unit Testing and Generating Source Code for Unit Test Frameworks Using Visual Studio 2005 Team System", http://microsoft.com/en-us/library/ms364064(VS.80,printer).aspx, 13 pp. (Sep. 2005).

Squires, Charles W. et al., U.S. Appl. No. 11/522,710, filed Sep. 18, 2006 entitled "Computer-Implemented System for Generating Automated Tests From a Web Application".

* cited by examiner

AUTOMATION ENGINE CODE
EXAMPLE

```
Login.SDD - Notepad
C  SetApplicationMap    EG30.MAP
C  SetVariableValues    ^passwd=^password      ^username=^UserID
T  LogonScreenWindow    UserNameEditBox  SetTextValue   ^username
T  LogonScreenWindow    PasswordEditBox  SetTextValue   ^passwd
T  LogonScreenWindow    LogonPushButton  click
C  WaitForGUI      WRS  Logoff 60
```

| | File Step Actions Execution Customize Parameter Management Configuration Help |
|---|---|

Test Case Information
Purpose: Action Word    Date Created: 
Author: winosu ▼ Start State:   System: ▼   Set Parameters...
Req:    End State:   Subsystem: ▼   Last Modified:

| No. | Description | Command/Action | Parameter | Rec Type | K |
|---|---|---|---|---|---|
| 1 | Set the text of the editbox | UserNameEditBox-> SetTextValue | MainWindow==>LogonScreenWindow ¦¦ Component==>1 | Component Functions | 1 |
| 2 | Set the text of the editbox | PasswordEditBox-> SetTextValue | MainWindow==>LogonScreenWindow ¦¦ Component==>1 | Component Functions | 2 |
| 3 | Attempts to perform a standard Click on the PushButton | LogOnPushButton-> Click | MainWindow==>LogonScreenWindow ¦¦ Component==>1 | Component Functions | 3 |
| 4 | Wait for a Window or Window Component to become va | WaitForGUI | WindowID==>WRS ¦¦ ComponentID==>LogOff ¦¦ Timeout | Driver Command | 4 |

AUTOMATION APPLICATION
MAP EXAMPLE

```
3  (LoginWindow)
3  LoginWindow="Type=Window:Caption=(Log*)"
3  JavaWindow2="Type=JavaWindow:JavaCaption=Login:\:Typ
3  JavaPanel1="Type=JavaWindow:JavaCaption=Login:\:Type
3  JavaPanel2="Type=JavaWindow:JavaCaption=Login:\:Type
3  JavaPanel3="Type=JavaWindow:JavaCaption=Login:\:Type
3  JavaPanel4="Type=JavaWindow:JavaCaption=Login:\:Type
4  Username:="Type=JavaWindow:JavaCaption=Login:\:Type=
4  Password:="Type=JavaWindow:JavaCaption=Login:\:Type=
4  Save="Type=JavaWindow:JavaCaption=Login:\:Type=JavaP
4  OK="Type=JavaWindow:JavaCaption=Login:\:Type=JavaPan
4  Cancel="Type=JavaWindow:JavaCaption=Login:\:Type=Jav
4  Help="Type=JavaWindow:JavaCaption=Login:\:Type=JavaP
4  Machine:="Type=JavaWindow:JavaCaption=Login:\:Type=J
```

460 → Password line

Fig. 10

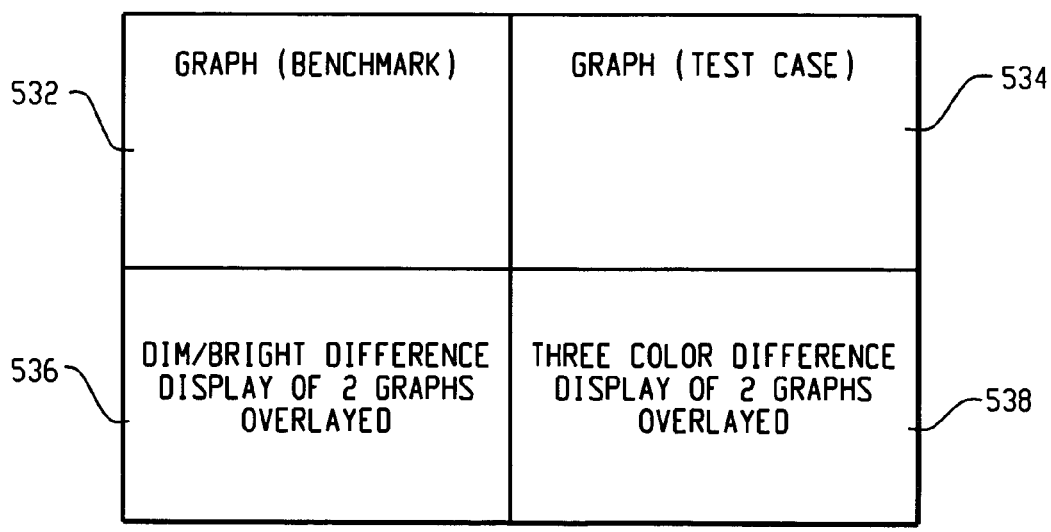

IMAGE RESLULTS DIFFERENCING TOOL

| GRAPH (BENCHMARK) | GRAPH (TEST CASE) |
| --- | --- |
| DIM/BRIGHT DIFFERENCE DISPLAY OF 2 GRAPHS OVERLAYED | THREE COLOR DIFFERENCE DISPLAY OF 2 GRAPHS OVERLAYED |

Fig. 12

| LEVEL1 TABLE TITLE | | | | |
|---|---|---|---|---|
| Qtr | REGION | CATALOG | PRICE | COST |
| 1 | CANADA | GARDENING | $579.00 | $280.50 |
| 1 | CANADA | PETS | $178.00 | $65.00 |
| 1 | CANADA | SPORTS | $1,856.00 | $883.00 |
| 1 | CANADA | TOYS | $7.98 | $5.55 |
| 1 | CENTRAL | COLLECTIBLES | $35.00 | $17.00 |
| 1 | CENTRAL | GARDENING | $1,974.00 | $923.00 |
| 1 | CENTRAL | PETS | $294.00 | $110.50 |
| 1 | CENTRAL | SOFTWARE | $500.78 | $400.75 |
| 1 | CENTRAL | SPORTS | $1,848.00 | $887.00 |
| 1 | CENTRAL | TOYS | $151.12 | $111.08 |
| 1 | NORTHEAST | COLLECTIBLES | $313.00 | $160.00 |
| 1 | NORTHEAST | GARDENING | $1,786.00 | $904.50 |
| 1 | NORTHEAST | PETS | $637.00 | $291.50 |
| 1 | NORTHEAST | SOFTWARE | $634.72 | $485.45 |
| 1 | NORTHEAST | SPORTS | $4,994.00 | $2,263.00 |
| 1 | NORTHEAST | TOYS | $353.97 | $295.09 |

*Fig. 16*

| LEVEL1 TABLE TITLE | | | | |
|---|---|---|---|---|
| Qtr | REGION | CATALOG | PRICE | COST |
| 1 | CANADA | PETS | $579.00 | $280.50 |
| 1 | CANADA | PETS | $178.00 | $65.00 |
| 1 | CANADA | PETS | $1,856.00 | $883.00 |
| 1 | CANADA | PETS | $7.98 | $5.55 |
| 1 | CENTRAL | PETS | $35.00 | $17.00 |
| 1 | CENTRAL | PETS | $1,974.00 | $923.00 |
| 1 | CENTRAL | PETS | $294.00 | $110.50 |
| 1 | CENTRAL | PETS | $500.78 | $400.75 |
| 1 | CENTRAL | PETS | $1,848.00 | $887.00 |
| 1 | CENTRAL | PETS | $151.12 | $111.08 |
| 1 | NORTHEAST | PETS | $313.00 | $160.00 |
| 1 | NORTHEAST | PETS | $1,786.00 | $904.50 |
| 1 | NORTHEAST | PETS | $637.00 | $291.50 |
| 1 | NORTHEAST | PETS | $634.72 | $485.45 |
| 1 | NORTHEAST | PETS | $4,994.00 | $2,263.00 |
| 1 | NORTHEAST | PETS | $353.97 | $295.09 |
| ⋮ | ⋮ | ⋮ | ⋮ | ⋮ |

Fig. 17

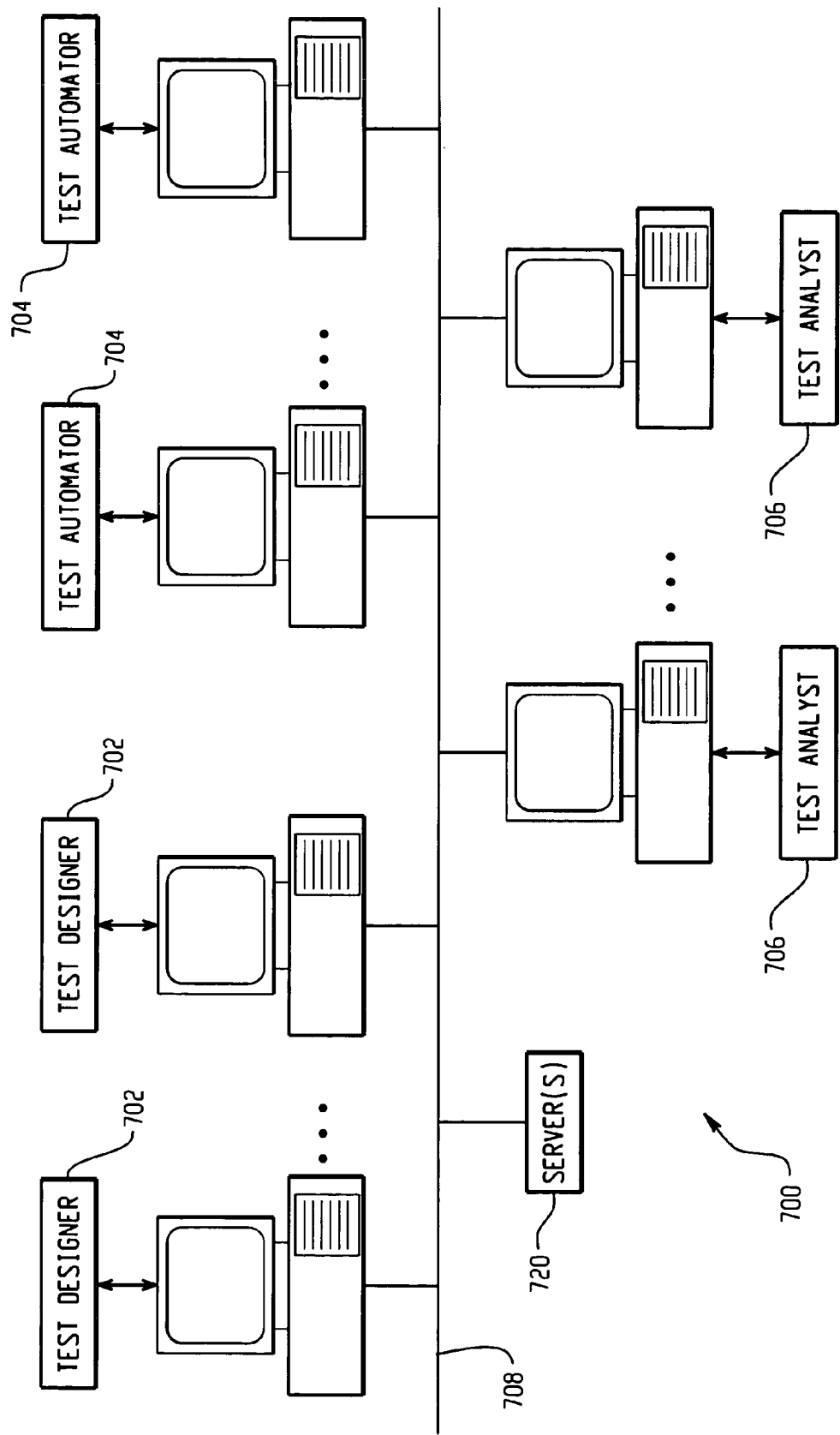

SYSTEM AND METHOD FOR SOFTWARE TESTING

TECHNICAL FIELD

The present invention relates generally to software testing and more particularly to computer systems for the testing of software.

BACKGROUND AND SUMMARY

Software testing environments exist for assisting a test automator to generate code to automatically test a target software application with respect to predetermined testing criteria. However, these environments tend to be confusing and otherwise inefficient to operate within for individuals who design test cases and/or for individuals who evaluate test results.

In accordance with the teachings provided herein, software testing systems and methods are disclosed herein for addressing these and other issues. As an example of a system and method, a test automator generates code to test the computer program with respect to predetermined testing criteria, and a test results analyst reviews test results generated by applying the code to test the computer program. The environments of a test automator and a test analyst are separated, thereby relieving a test results analyst from being required to have knowledge of the code or environment that was used to test the computer program.

BRIEF DESCRIPTION OF THE DRAWINGS

FIGS. 7-11 depict examples of a test automation environment;

FIGS. 12-18 depict examples of a test analysis environment; and

FIGS. 19 and 20 are block diagrams illustrating different network configurations.

DETAILED DESCRIPTION

Figure 1:
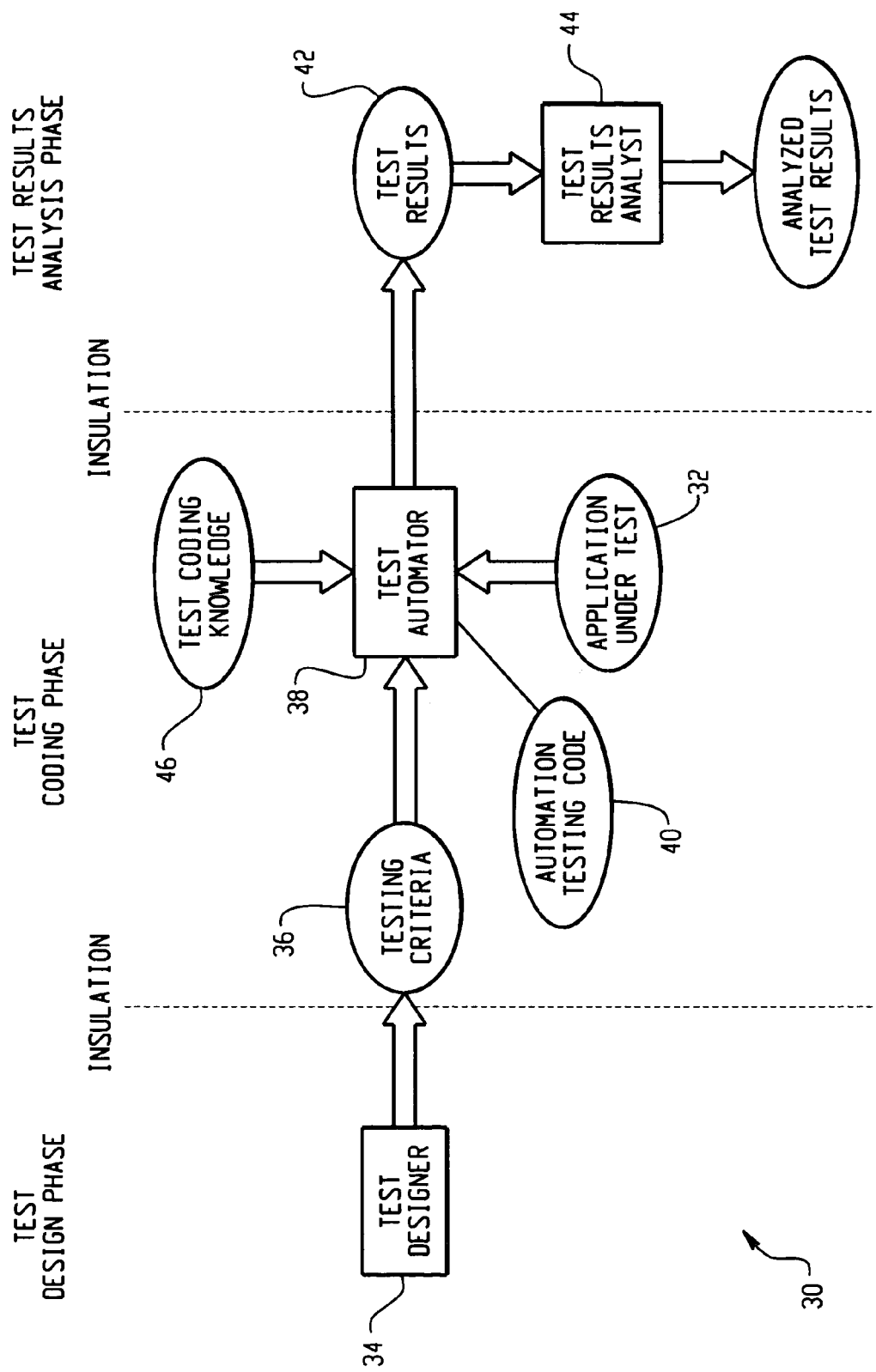
FIG. 1 is a block diagram depicting a software testing system.

FIG. 1 depicts at 30 a system for testing a software application 32. A test designer 34 generates testing criteria 36 for use by a test automator 38 in order to write code 40 to test the software application 32. The testing code 40 exercises the software application 32 based upon the actions specified in the testing criteria 36. Results 42 from the test are moved from the automation environment to the environment in which a test results analyst 44 operates so that the test results analyst 44 can evaluate how well the software application 32 performed.

The separated environments keep the test designer 34 and the test results analyst 44 insulated from the test coding automation implementation details 46. This allows non-programmers to develop and analyze sophisticated, robust automated test cases without programming knowledge as well as use automation independent tools to access the full power of automation code 40 without knowledge of its implementation details. The system also insulates the test automator 38 from application specific details, thereby allowing the test automator 38 to focus on successfully automating the application 32 under test without requiring any application specific knowledge.

Figure 2:
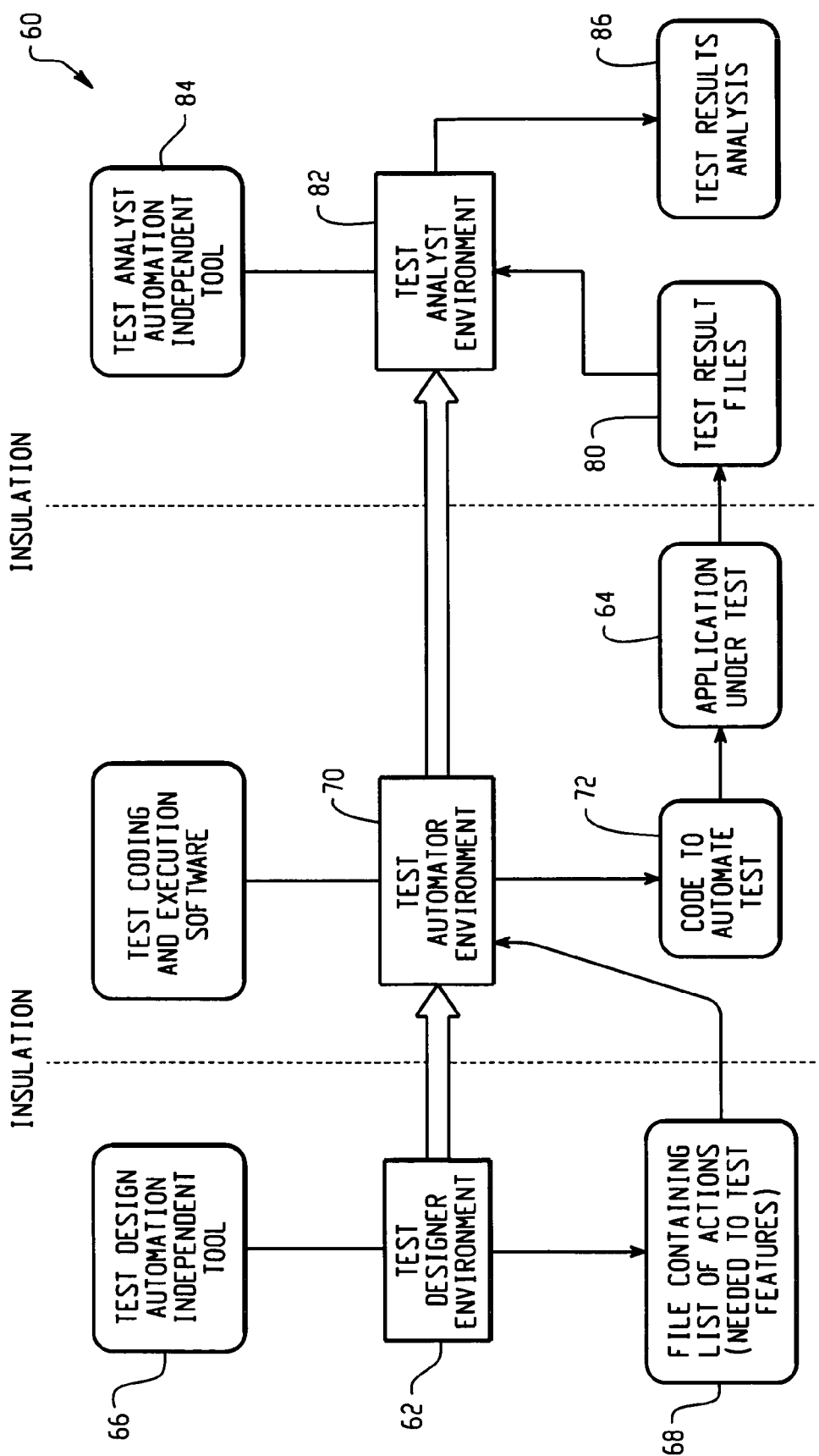
FIG. 2 is a block diagram depicting files and code being produced during testing of a software application.

FIG. 2 provides an example of an end-to-end testing system 60 wherein a test designer environment 62 allows a test designer to design tests for a software application 64 using a test design automation independent tool 66. Through use of the tool 66, a test designer creates a file 68 containing a list of actions needed to test the application 64. These typically are high-level actions that define a functional framework for the test automator to implement. The test designer is not required to have test automation programming knowledge.

A test automator is a testing programming skilled person and is insulated from an application's test details. Within a separated test automator environment 70, the test automator takes the high-level action list 68 and generates code 72 to drive the application 64 under test. For each action specified, the test automator's code 72 can be run independently. A test of the software generates one or more test result files 80 for a test analyst to validate.

Within a separated test analyst environment 82, a test analyst reviews test results 80 for the application 64 under test using a test results automation independent tool which compares the results of each automation run with bench files which have already been validated as correct. The automation tool 84 visually displays this comparison for analysis and validation. In addition to bench results, the automation tool 84 can allow a test analyst to include in the comparison previous runs to see how the test results are evolving. This can be helpful to a test analyst to provide her analysis 86 of whether the software application is getting closer to the bench results.

The test analyst's interface and environment 82 are insulated from the test automation details. As an illustration, the test analyst's interface automatically receives or copies the automation test result files 80 from the test automation environment 70. In this way, the system 60 allows test results to be provided in a separate, file comparison GUI environment, thereby removing the need for a test analyst to perform test analysis within the test automation framework as well as removing the confusion that test analysts may have because they are not familiar with the technical details of the automation environment.

The environment separation between the roles of a test analyst and test automator results in a robust, reusable, easily maintainable, and cost effective testing system 60 in that, organizations comprised mainly of non-programming individuals, whose skill sets are targeted to the expertise required by the application under test, can take advantage of software testing automation. It should be understood that terms such as test designer, test automator, and test results analyst refer to the role or function of a test designer or test automator or test results analyst. As an illustration, one or more individuals can be used to fulfill the role of a test analyst for a particular test run. Moreover, while the separated environments allow for the different roles to operate in an insulated fashion, the same person could fulfill two or more of the roles when utilizing the separated environments.

Figure 3:
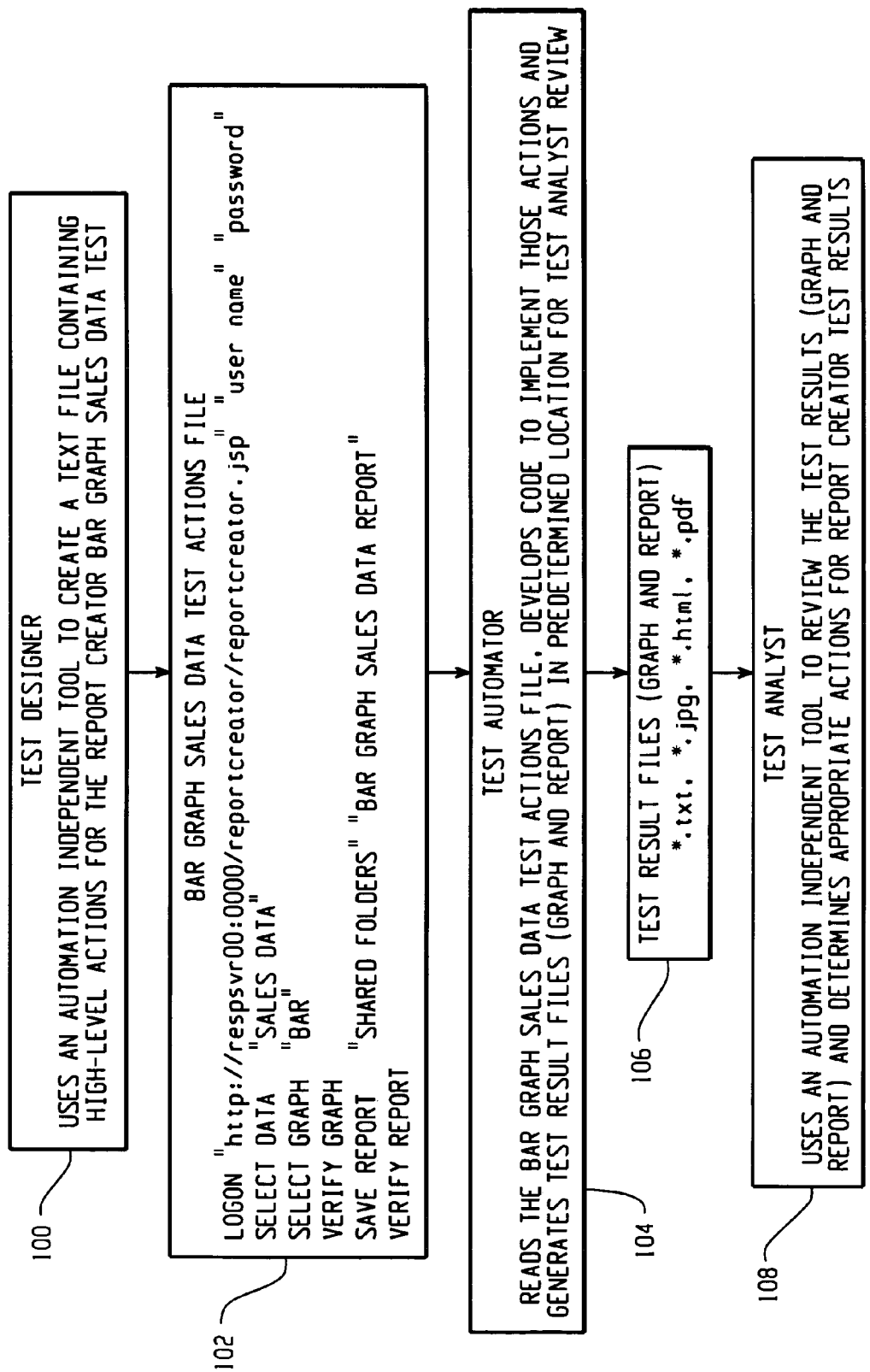
FIG. 3 is a process flow diagram depicting an example of testing a software application.

FIG. 3 shows an example wherein a web-based report creation application is to be tested. This Report Creator application allows users to create, view and save a wide-variety of reports containing various tables and graphs. A test designer uses at 100 a test design automation independent tool to create a text file containing high-level actions for the report creation application test.

The test designer determines what testing needs to be performed on the report creation application by deciding to start with a test, called Bar Graph Sales Data Test. This test will validate that the Report Creator application can successfully enable a user to log on, create, view and save a report that contains a bar graph. The test designer decides what test actions need to be taken inside the Report Creator application to accomplish this bar graph test. The test designer inputs their list of actions into a test design automation independent tool which generates a file 102 containing test actions for a test automator to automate. As an example, a test actions file 102 can specify that the logon functionality is to be exercised as well as selecting different data and graphs in order to generate a report. Such a test actions file 102 may resemble the following:

| Bar Graph Sales Data Test Actions File: | |
| --- | --- |
| Actions | Parameters |
| Logon | "http://repsvr00:0000/reportcreator/reportcreator.jsp" "user name" "password" |
| Select Data | "Sales Data" |
| Select Graph | "Bar" |
| Verify Graph | |
| Save Report | "Shared Folders" "Bar Graph Sales Data Report" |
| Verify Report | |

Because the test designer inputs these actions through a test design automation independent tool whose environment is separate and distinct from the test automation environment, the test designer is insulated from the automation details implemented by the test automator.

As shown at 104, a test automator, employing any number of tools and technologies, designs and implements software code to automate the test steps that are necessary to make the test actions specified in the Bar Graph Sales Data Test action file above repeatable. Based upon the top-level actions in the test design file, the test automator generates code to perform more detailed steps. For example, the test automator could generate test automation code for the Logon action in order to perform such lower-level steps as:

```
Logon:
    Launch browser
    Enter URL text
    Identify and recognize Logon Screen
        Get focus on User name text box
        Enter User name text
        Get focus on Password text box
        Enter Password text
        Send click to Logon button
    ...
```

Because the test automator does not have to review the test results generated by the automation of the Bar Graph Sales Data Test of the Report Creator, the test automator is insulated from details specific to the application under test. It is optional for a test automator to actually perform the execution of the application.

The test results 106 are provided to a test analyst using a format that the test analyst environment can handle. Graphic-based test results can be provided as JPEG or other format, such as in a PDF format. Text-based results can be provided in a word processing document or rendered in a text document (e.g., ".txt" file). Web-based pages can be provided as HTML files for viewing by a test analysis automation independent tool having web browsing capabilities.

A test analyst reviews at 108 test results produced by the automated Bar Graph Sales Data Test run by interacting with a test analysis automation independent tool. The tool can compare the test results of the latest automated Bar Graph Sales Data Test run with the results previously deemed to be valid, benchmarked results by the same or different test analyst. Because this comparison is surfaced to the test analyst via an automation independent tool, they are insulated from the heart of the automation details implemented by the test automator. The test analyst is not required to have any understanding of how the test results were produced. However, they are typically very knowledgeable in evaluating the results in the context of the resultant file generated by the test designer.

Figure 4:
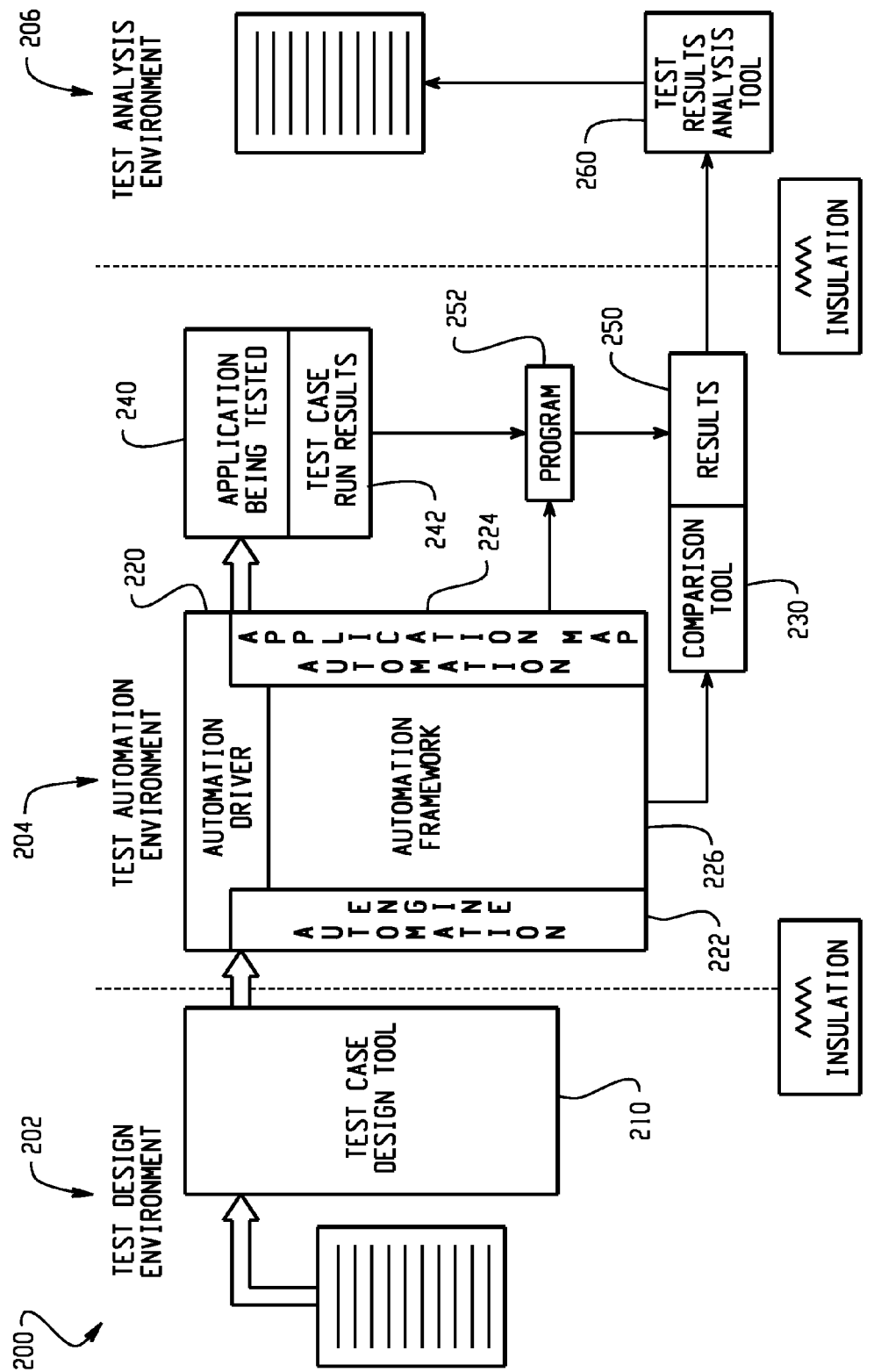
FIG. 4 is a block diagram depicting various tools that might be used within a software testing system.

FIG. 4 illustrates at 200 different tools that may be used within each environment (e.g., environments 202, 204, 206) in order to handle the end-to-end testing of the web-based report creation application. It should be understood that each environment (202, 204, 206) may use more or less tools than what are shown and discussed herein.

Figure 5:
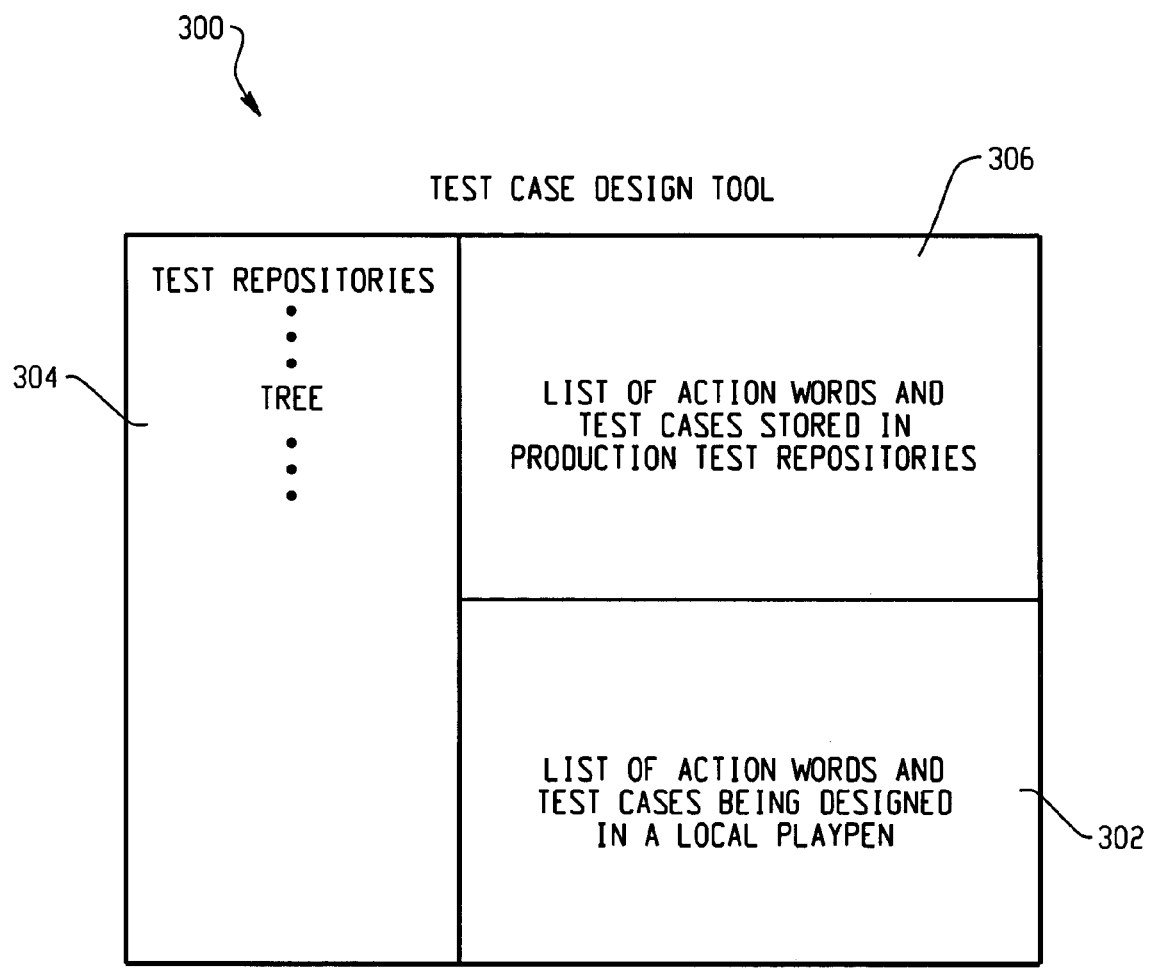
FIGS. 5 and 6 are graphical user interfaces depicting test case design tools.

A test design environment 202 may include a test case design tool 210 such as the one 300 shown in FIG. 5. With reference to FIG. 5, a test designer can use the graphical user interface (GUI) 300 to create top-level test actions 302 for an application under test. GUI region 304 indicates what test repositories are available to a test designer by providing a tree that lists the applications being tested by the automation process. In the current example, the web-based report creation application would be listed in GUI region 304.

GUI region 306 provides a list of action words and test cases stored in a test repository. This helps ensure that relevant and acceptable action words are used in formulating a test design. The test cases provided in region 306 are previously created testing scenarios. The stored test cases can be retrieved by a test designer so that the test designer can use or modify a stored test case to fit the testing situation at hand.

The actions designated by the test designer through interaction with region 306 are added to region 302. Region 302 provides for manipulation of the actions specified in the region, such as allowing a user to reorder or delete actions in region 302.

Figure 6:
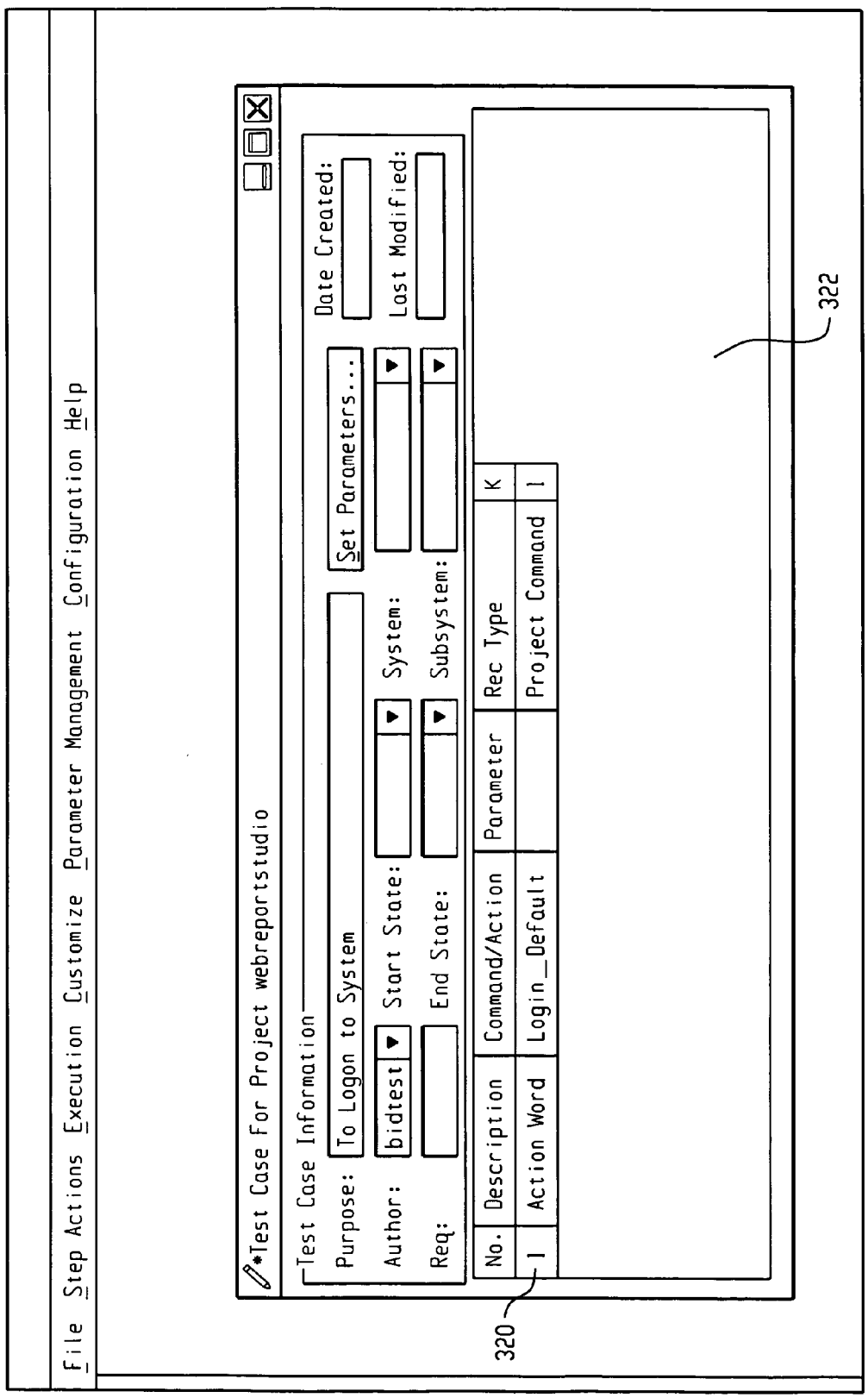

FIG. 6 illustrates a test case that has been developed for the application under test. In region 320 of GUI 322 a test designer would just type in "login" in order for that functional aspect of the application to be exercised. For this example, the remainder of the actions list resembles:

| Actions | Parameters |
| --- | --- |
| Select Data | "Sales Data" |
| Select Graph | "Bar" |
| Verify Graph | |
| Save Report | "Shared Folders" "Bar Graph Sales Data Report" |
| Verify Report | |

The action list generated through a test case design tool is provided to the test automation environment.

With reference back to FIG. 4, the test automation environment 204 includes a test automation driver interface 220. A test automator accesses the driver interface 220 in order to generate lower level test automation code for implementing the higher level test actions. An automation engine 222 helps the user generate the test automation code by abstracting the details of the automation control code. The test automation code is translated into an automation application map 224 through an automation framework 226. The automation framework 226 contains information on how to map the test automator-generated code to a still lower level computer code (termed in this example the "automation application map") whose executable version is used to perform the testing of the application 240. The automation application map code 224 is invoked and tests the application 240 under test. Test case run results 242 are compiled and compared to benchmark case(s) via a test case run result comparison tool 230.

Figures 7, 9:
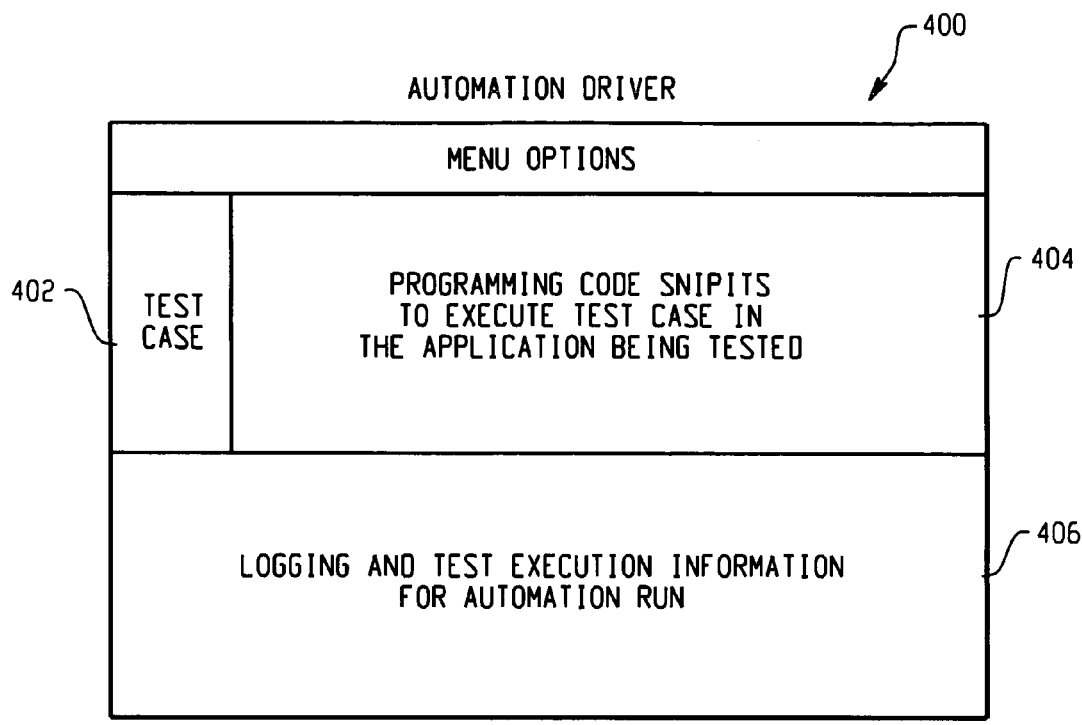

Examples of the test automation environment 204 are shown in FIGS. 7-11. FIG. 7 shows at 400 an automation driver GUI wherein a test automator can view in region 402 the actions specified by a test designer. Region 404 allows a test automator to enter programming code segments for executing the test case upon the application under test. Region 406 shows logging and test execution information related to an automation run for the application.

Examples of code portions that a test automator might enter into region 406 of FIG. 7 are shown at 420 on FIG. 8. As an illustration, a test automator may enter code segment 422 in order to set the value of the user name. The test automator is required to know the field name on the application's logon user interface in order to set during the test the user name value to the proper value. Other code segments illustrate the detailed test programming knowledge that a test automator is required to have, such as code segment 424 which specifies the specific logon push button component name on the application's user interface. This is specified by the test automator so that the component button can be clicked during the test after the user name and password have been entered.

The code of FIG. 9 is an example of automation engine code and was generated at least in part from the code segments shown in FIG. 8. This code was generated by a computer program that associates high level commands (e.g., the commands shown in FIG. 8) with user-defined specific parameters as shown in FIG. 9. The automation engine code represents commands to be performed during the test, such as the SetVariableValues command which sets the value for the user name as shown at 440 on FIG. 9.

The automation application map is a lower-level version of the automation engine code. As an illustration, line 460 on FIG. 10 is Java code that corresponds at least in part to the SetVariableValues command shown at 440 on FIG. 9 which when compiled and executed during the test will set the user name value. The automation framework was used to generate the automation application map, such as to determine a GUI recognition string that would uniquely act upon a GUI control (e.g., a textbox). The GUI control name is then listed alongside the recognition string.

Figure 11:
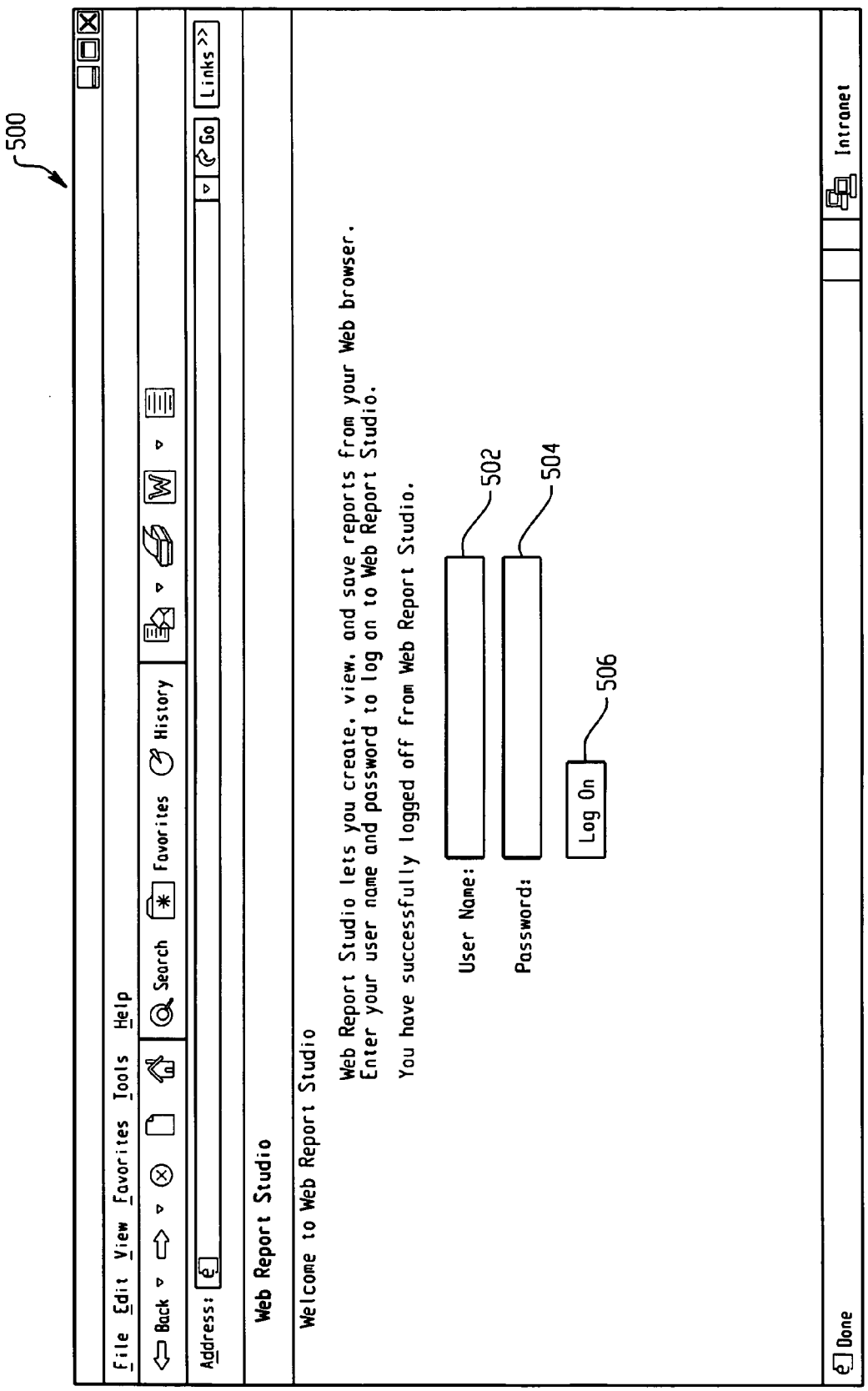

The code contained in the automation application map is executed in order to test the application. As shown in FIG. 11, the application under test has a logon screen 500 whose user name field 502 and password field 504 will be completed during execution of the test automation code. The code will automatically provide the clicking action for the logon button 506 after providing the user name and password values. The code then continues execution until the test run is complete.

With reference back to FIG. 4, the test results and the benchmark comparison 250 are moved automatically by a program 252 that operates either with the test automation environment 204 and/or test analyst environment 206). The data is moved without a test analyst having to enter into the test automation environment 204 (or test execution environment if it is separate therefrom) in order to analyze the test results 250. Within the separate and isolated test analysis environment 206, a test analyst can access any number of tools (e.g., tool 260. Examples of a test analysis environment 206 with respect to the current example are shown in FIGS. 12-18.

FIG. 12 shows a test analyst GUI tool 530 that displays image test results differences. This tool is useful when the test results include graphical information. Region 532 shows the benchmark graphical information adjacent to the current test case graphical information shown in region 534. The side-by-side placement allows for easier comparison by the test analyst. Region 536 contains a dim/bright difference display of two graphs being overlaid. Region 538 contains a three color overlay highlighting the differences of the graphs being overlaid. Regions 536 and 538 allow a test analyst to quickly have a visual depiction of the differences between the graphs being compared.

Figure 13:
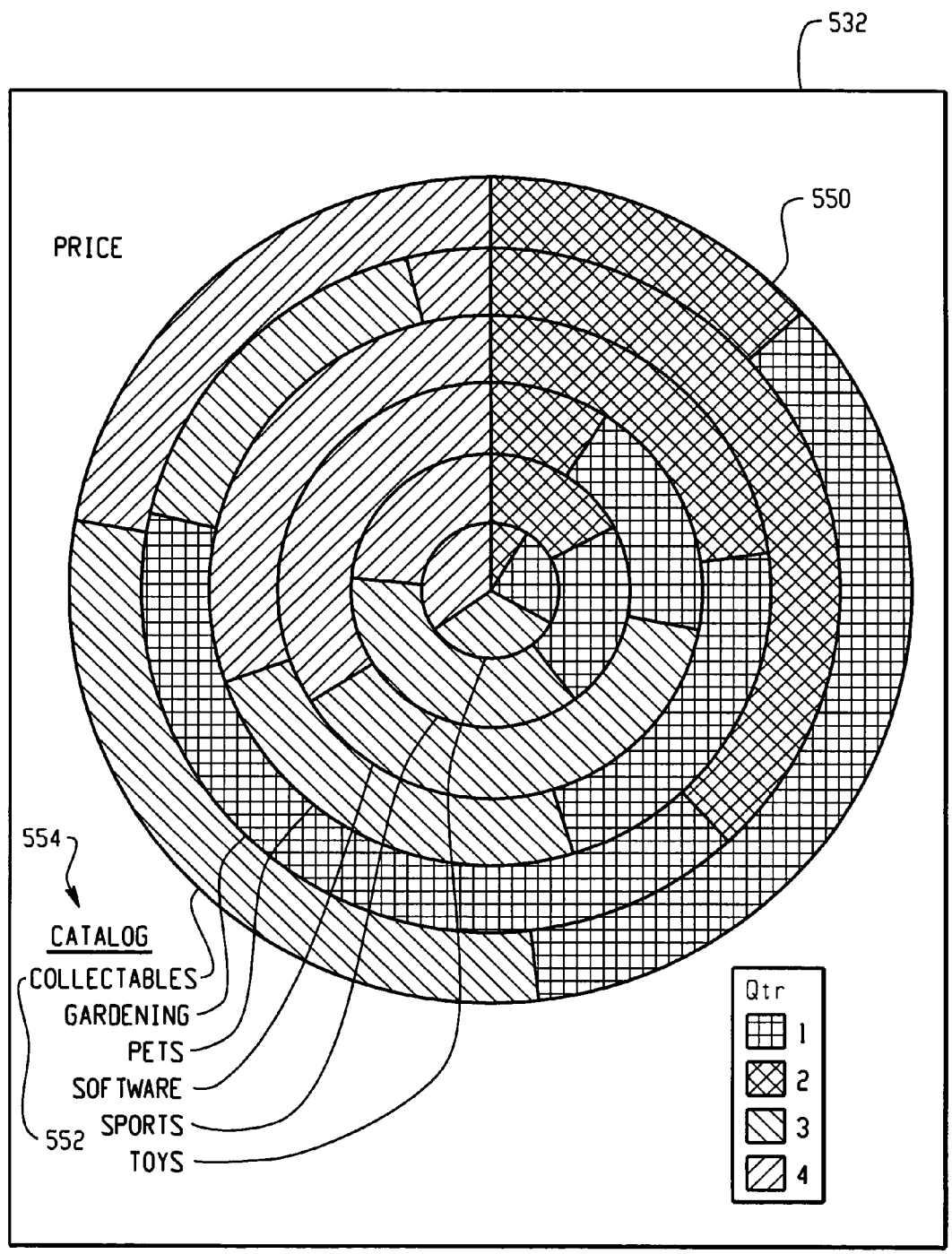
Figure 14:
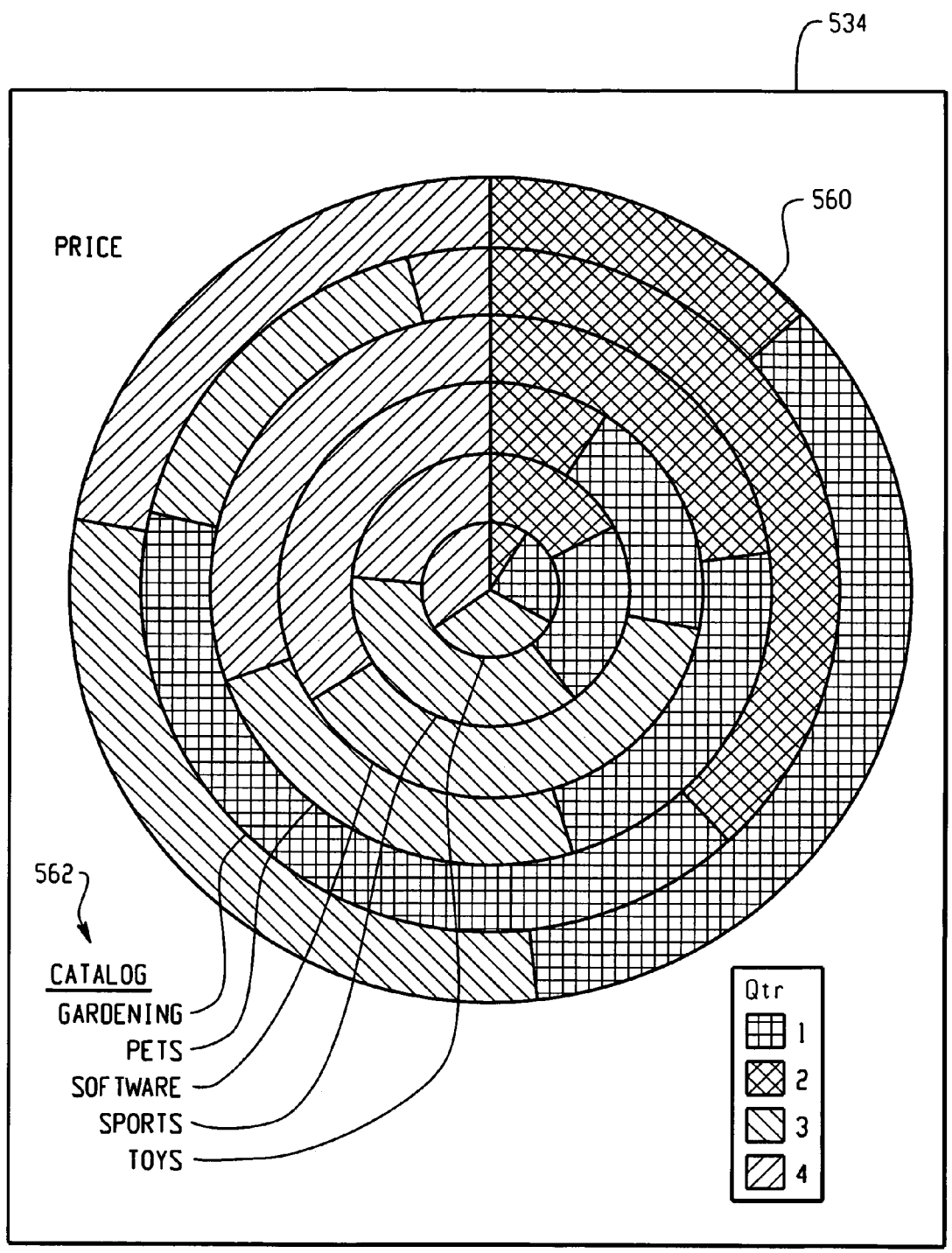

As an illustration, region 532 may contain benchmark pie chart graphical information 550 as shown in FIG. 13. Region 534 may contain test case pie chart graphical information 560 as shown in FIG. 14. With a side-to-side comparison provided by the image test results differences tool, a test analyst can more readily identify anomalies, such as the "Collectibles" label 552 that appears in the benchmark pie chart 550 of FIG. 13, but does not appear in the labels 562 of the test case pie chart 560 of FIG. 14.

Figure 15:
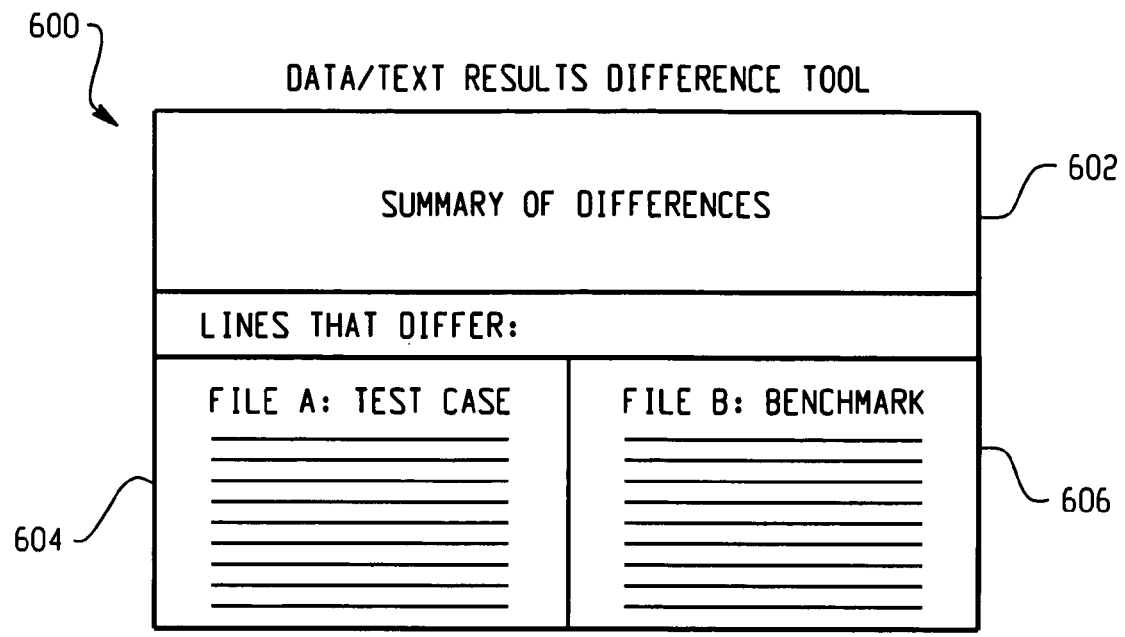

Another test analyst tool that may be included in a test analyst environment is shown in FIG. 15 wherein GUI 600 displays data/text test results differences. Region 602 provides a summary of textual differences between a benchmark and a test case. Region 604 shows benchmark textual information adjacent to the current test case textual information shown in region 606. The side-by-side placement allows for easier comparison by a test analyst.

As an illustration, region 604 may contain benchmark tabular textual information 610 as shown in FIG. 16. Region 606 may contain test case tabular textual information 612 as shown in FIG. 17. With a side-to-side comparison provided by the textual test results differences tool, a test analyst can more readily identify anomalies, such as the "Catalog" column having values as shown at 620 in FIG. 16, but only showing the value of "Pets" for every row in the "Catalog" column as shown at 630 in FIG. 17.

Figure 18:
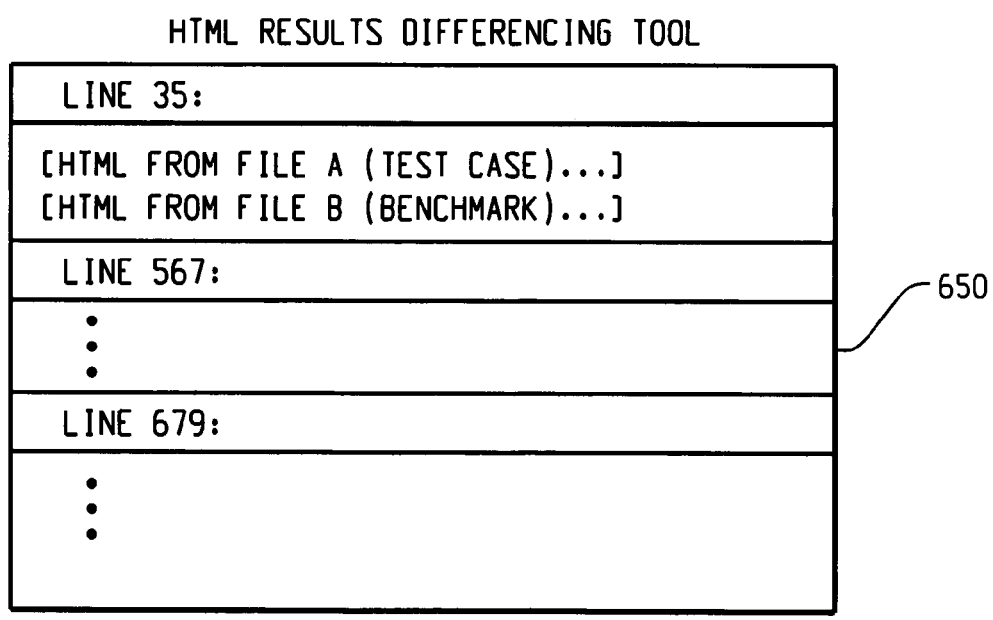

It should be understood that a test results analysis environment may contain other tools, such as an HTML results differencing tool shown in FIG. 18 wherein GUI 650 shows locations in the code of the application that exhibit HTML differences between a test case and the benchmark. The HTML differences may help explain the anomalies that arose between FIGS. 13 and 14 as well as those that arose between FIGS. 16 and 17.

While examples have been used to disclose the invention, including the best mode, and also to enable any person skilled in the art to make and use the invention, the patentable scope of the invention is defined by claims, and may include other examples that occur to those skilled in the art. For example, the steps and the order of the steps in the process flows described herein may be altered, modified and/or augmented and still achieve the desired outcome.

Figure 20:
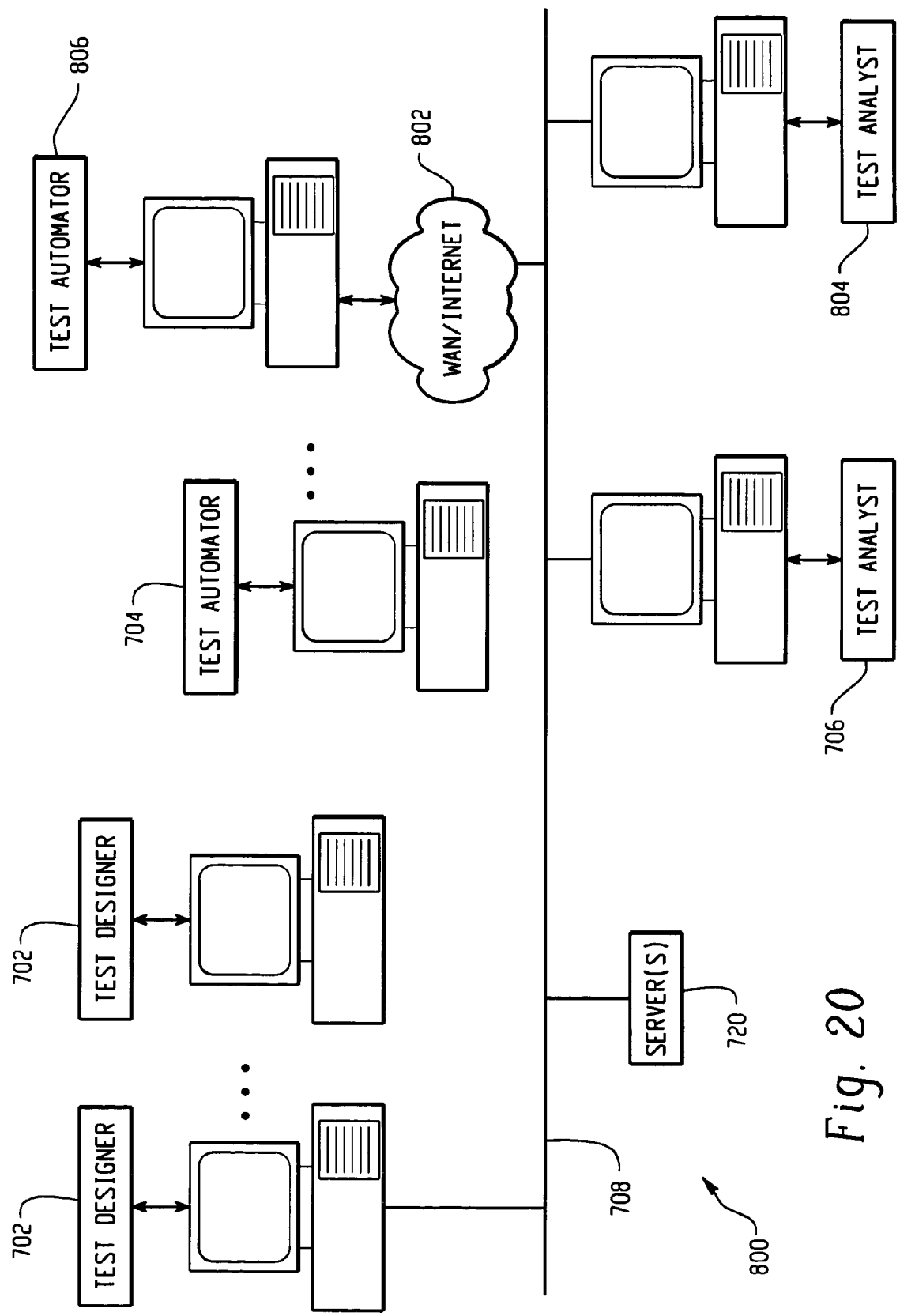

As another example of the wide variation of the disclosed systems and methods, the systems and methods may be implemented on various types of computer architectures, such as for example on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices. FIGS. 19 and 20 help illustrate just several of the many different types of configurations.

FIG. 19 shows at 700 a configuration wherein one or more test designers 702, test automators 704, and test analysts 706 operate on a network 708. Their respective test-related and separate environments may be resident on their computers or stored on server(s) 720 accessible over the network 708.

FIG. 20 shows at 800 a configuration wherein test personnel can operate over a wide area network (WAN) 802, such as the Internet. As an illustration, a test analyst 804 can be remotely located from a test automator 806 because they do not share testing environments, and test results are removed from the test automation environment in order to be provided to the test analyst environment.

The systems' and methods' data disclosed herein, such as generated test results, may be stored as one or more data structures in computer memory and/or storage depending upon the application at hand. Data structures describe formats for use in organizing and storing data in memory or other computer-readable media for use by a computer program. It should be further understood that many different types of software applications can be tested, including those applications that do not have user interfaces. Furthermore, the testing of a software application may examine a wide variety of characteristics, such as user interface characteristics, performance characteristics, etc.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed as the invention:

1. A system for evaluating tests of a computer program, comprising:
   one or more processors;
   a computer-readable storage medium containing instructions configured to cause the one or more processors to perform operations, including:
   creating a file containing a list of required actions for testing an application, wherein the file includes automation control code, and wherein the file is created by a test designer on a test design automation independent tool within a first insulated environment;
   automatically transmitting the file to a test coding and execution automator in a second insulated environment that is separate from the first insulated environment;
   receiving the file in the second insulated environment, wherein an interface is generated through which the test coding and execution automator enters one or more code segments, and uses an automation engine to generate test automation code by associating the one or more code segments with one or more details abstracted from the automation control code;
   using an automation framework to translate the test automation code into an automation application map by mapping the test automation code to the automation application map, wherein the automation application map includes a lower level of executable computer code used to test the application;
   executing the automation application map code to test the application and produce test results;
   automatically transmitting the test results to a test analysis automation independent tool in a third insulated environment that is separate from the first and second insulated environments; and
   receiving the test results in the third insulated environment and comparing the received test results to one or more other received test results, wherein the comparison is done by a test results analyst using the test analysis automation independent tool in the third insulated environment.

2. The system of claim 1, wherein the automatically transmitting of the test results to the test analysis automation independent tool in the third insulated environment involves copying or moving the test results from the second insulated environment to the third insulated environment.

3. The system of claim 2, wherein the third insulated environment includes an internet web browser for viewing received test results.

4. The system of claim 1, wherein the format of the received test results include JPEG, HTML, GIF, and combinations thereof.

5. The system of claim 1, wherein the list includes an action to test a computer-human interface generated by the computer program.

6. The system of claim 1, wherein the list includes an action to test performance of the computer program.

7. The system of claim 1, wherein the first insulated environment, the second insulated environment, and the third insulated environment operate on a network such that each of the environments are accessible through different computer terminals, wherein the first insulated environment operates on a first computer which does not contain the second insulated environment or the third insulated environment, wherein the second insulated environment operates on a second computer which does not contain the first insulated environment or the third insulated environment, and wherein the third insulated environment operates on a third computer which does not contain the first insulated environment or the second insulated environment.

8. A computer-implemented method for evaluating tests of a computer program, comprising:
   creating a file containing a list of required actions for testing an application, wherein the file includes automation control code, and wherein the file is created by a test designer on a test design automation independent tool within a first insulated environment;

automatically transmitting the file to a test coding and execution automator in a second insulated environment that is separate from the first insulated environment;

receiving the file in the second insulated environment, wherein an interface is generated through which the test coding and execution automator enters one or more code segments, and uses an automation engine to generate test automation code by associating the one or more code segments with one or more details abstracted from the automation control code;

using an automation framework to translate the test automation code into an automation application map by mapping the test automation code to the automation application map, wherein the automation application map includes a lower level of executable computer code used to test the application;

executing the automation application map code to test the application and produce test results;

automatically transmitting the test results to a test analysis automation independent tool in a third insulated environment that is separate from the first and second insulated environments; and receiving the test results in the third insulated environment and comparing the received test results to one or more other received test results, wherein the comparison is done by a test results analyst using the test analysis automation independent tool in the third insulated environment.

9. Computer software stored on one or more computer-readable storage mediums, the computer software comprising program code for carrying out a method for evaluating tests of a computer program, the method comprising:

creating a file containing a list of required actions for testing an application, wherein the file includes automation control code, and wherein the file is created by a test designer on a test design automation independent tool within a first insulated environment;

automatically transmitting the file to a test coding and execution automator in a second insulated environment that is separate from the first insulated environment;

receiving the file in the second insulated environment, wherein an interface is generated through which the test coding and execution automator enters one or more code segments, and uses an automation engine to generate test automation code by associating the one or more code segments with one or more details abstracted from the automation control code;

using an automation framework to translate the test automation code into an automation application map by mapping the test automation code to the automation application map, wherein the automation application map includes a lower level of executable computer code used to test the application;

executing the automation application map code to test the application and produce test results;

automatically transmitting the test results to a test analysis automation independent tool in a third insulated environment that is separate from the first and second insulated environments; and receiving the test results in the third insulated environment and comparing the received test results to one or more other received test results, wherein the comparison is done by a test results analyst using the test analysis automation independent tool in the third insulated environment.

\* \* \* \* \*